UNITED STATES PATENT OFFICE.

DIODOR BRIANSKY, OF NO. 16 MALAIA MORSKAIA, ST. PETERSBURG, RUSSIA.

IMPROVEMENT IN COATING AND PROTECTING THE SILVERING OF MIRRORS.

Specification forming part of Letters Patent No. 42,270, dated April 12, 1864.

*To all whom it may concern:*

Be it known that I, DIODOR BRIANSKY, of No. 16 Malaia Morskaia, St. Petersburg, in the Empire of Russia, late captain in the Imperial army, have invented a new and useful Improvement in the Mode of Preserving and Protecting the Silvering of Mirrors; and I do hereby declare that the following is a full, clear, and exact description thereof—that is to say:

My invention consists in the application to the silvered surfaces of mirrors of an adherent elastic coating as a means of preserving the said surfaces from the destructive effects of shocks, friction, moisture, and other causes of deterioration to which they may be exposed.

The preparations which I employ in the execution of the coating processes are as follows:

No. 1. Caoutchouc, three pounds, (3 lbs.,) dissolved in naphtha, seven pounds, (7 lbs.)

No. 2. Caoutchouc, three pounds, (3 lbs.,) dissolved in naphtha, five pounds, (5 lbs.) To this solution heated to ebullition is added, by small portions, benzine, two pounds, (2 lbs.,) after which the mixture is left to cool. The object of this addition of benzine is to neutralize the effects of the fatty bodies contained in the naphtha.

No. 3. This preparation is composed of an oil varnish, with which is incorporated a quantity of minium, zinc-white, or other metallic pigment. The mixture, being thoroughly ground up, is brought to the requisite degree of fluidity by the addition of four parts of essence of turpentine and one part of the solution No. 1.

No. 4. Linseed-oil, one and a half pound, ($1\frac{1}{2}$ lb.;) essence of turpentine, one and a half pound, ($1\frac{1}{2}$ lb.;) tallow, one and a half pound, ($1\frac{1}{2}$ lb.;) zinc-white, one and a quarter pound, ($1\frac{1}{4}$ lb.;) minium, one and a quarter pound, ($1\frac{1}{4}$ lb.;) binoxides of iron, three-quarters of a pound, ($\frac{3}{4}$ lb.;) slaked lime, three-quarters of a pound, ($\frac{3}{4}$ lb.;) Portland cement, one-half pound, ($\frac{1}{2}$ lb.;) beeswax, one-quarter pound, ($\frac{1}{4}$ lb.;) gutta-percha, one-quarter pound, ($\frac{1}{4}$ lb.;) sulphate of lead, one-quarter pound, ($\frac{1}{4}$ lb.) These ingredients, being ground up, are heated together until the volume of the mass is reduced by about one-fifteenth. The product of this operation, being cooled, is again ground up and reduced by essence of turpentine to the consistence of sirup.

First operation. The mirror being placed on a suitable table its silvered surface is coated with the solution No. 1, over which are applied sheets of unsized paper, care being taken to render their adhesion as complete as possible. After reposing for from ten to twenty hours the paper is removed, carrying with it the most of the adhesive coating, and the silvered surface is carefully cleaned, after which the mirror is laid aside in a chamber heated to from 70° to 75° Fahrenheit. In this operation the silvering is freed by the naphtha of the solution from all fatty and other impurities, and is at same time strengthened by the caoutchouc, which, in penetrating into its pores, forms the foundation of the subsequent coatings. On the other hand, the unsized paper absorbs the oily substances taken up by or contained in the naphtha, and thus prevents the formation of grease spots on the glass.

Second operation. The surface prepared as above is covered with a thin but uniform coat of the solution No. 2, and the glass is left to repose for two or three days. If necessary, the desiccation may be accelerated by increasing the temperature of the chamber to 100° Fahrenheit.

Third operation. The second coat, being dried as above, is covered with the mixture No. 3, and the mirror is again left to repose during one or two days, according to the temperature.

Fourth operation. This final process consists in the application of the composition No. 4 in successive layers, repeated according to degree of thickness and resistance required. The last coating being firmly set the mirror is ready for use.

Having now described the nature of the said improvement and the manner of carrying it into effect, I would have it understood that I do not confine myself to the precise details of preparation above laid down, as these may obviously be modified without deviating from the principle or characteristic features of my invention; but

What I claim, and desire to secure by Letters Patent, is—

The application in successive layers to the silvered surfaces of mirrors, in manner and for the purpose substantially as herein set forth, of plastic protective compounds, combining, like those above enumerated, the essential qualities of elasticity, tenacity, impermeability, insolubility, and adhesiveness.

DIODOR BRIANSKY.

Witnesses:
NICOLAS TELESCHEFF,
CONSTANTIN TELESCHEFF.